(12) United States Patent
Holdren et al.

(10) Patent No.: US 9,911,408 B2
(45) Date of Patent: Mar. 6, 2018

(54) DYNAMIC SPEECH SYSTEM TUNING

(71) Applicant: General Motors LLC, Detroit, MI (US)

(72) Inventors: John L. Holdren, Ferndale, MI (US); Gaurav Talwar, Novi, MI (US); Xufang Zhao, Windsor (CA)

(73) Assignee: General Motors LLC, Detroit, MI (US)

( * ) Notice: Subject to any disclaimer, the term of this patent is extended or adjusted under 35 U.S.C. 154(b) by 116 days.

(21) Appl. No.: 14/195,293

(22) Filed: Mar. 3, 2014

(65) Prior Publication Data
US 2015/0248881 A1   Sep. 3, 2015

(51) Int. Cl.
*G01L 13/00* (2006.01)
*G10L 15/06* (2013.01)
*G10L 13/08* (2013.01)
*G10L 15/01* (2013.01)
*G10L 13/00* (2006.01)

(52) U.S. Cl.
CPC .............. *G10L 15/06* (2013.01); *G10L 13/08* (2013.01); *G10L 13/00* (2013.01); *G10L 15/01* (2013.01)

(58) Field of Classification Search
None
See application file for complete search history.

(56) References Cited

U.S. PATENT DOCUMENTS

| | | | | |
|---|---|---|---|---|
| 5,615,300 A * | 3/1997 | Hara | ..................... | G10L 13/047 704/260 |
| 6,078,885 A * | 6/2000 | Beutnagel | ............. | G10L 15/063 704/231 |
| 6,119,085 A * | 9/2000 | Lewis | ..................... | G10L 13/04 704/255 |
| 6,370,503 B1 * | 4/2002 | Ortega | ..................... | G10L 15/22 704/235 |
| 7,373,248 B2 * | 5/2008 | Schalk | ............... | G01C 21/3608 340/989 |
| 7,580,837 B2 * | 8/2009 | Bushey | .................. | G10L 15/063 704/244 |
| 7,742,921 B1 * | 6/2010 | Davis | ..................... | G10L 13/00 704/235 |
| 8,447,603 B2 * | 5/2013 | Hoory | ..................... | G10L 15/10 704/235 |
| 8,589,162 B2 * | 11/2013 | Lejeune | .................. | G10L 15/08 704/251 |
| 9,311,913 B2 * | 4/2016 | Legat | ..................... | G10L 13/08 |
| 2003/0154080 A1 * | 8/2003 | Godsey | ............... | G10L 19/0018 704/251 |
| 2007/0005206 A1 * | 1/2007 | Zhang | ....................... | G06F 3/16 701/36 |
| 2007/0106685 A1 * | 5/2007 | Houh | ................ | G06F 17/30796 |
| 2010/0250243 A1 * | 9/2010 | Schalk | ..................... | G10L 15/30 704/201 |

(Continued)

*Primary Examiner* — Richard Zhu
(74) *Attorney, Agent, or Firm* — David Willoughby Reising Ethington P.C.

(57) ABSTRACT

A system and method of tuning speech recognition systems includes performing text-to-speech conversion of text data; detecting the accuracy of speech converted from text data; determining that the detected accuracy is below a predetermined threshold; recording a user recitation of the text data in response to the determination; and storing the user recitation in an exception database located at a vehicle.

14 Claims, 5 Drawing Sheets

(56) References Cited

U.S. PATENT DOCUMENTS

| | | | |
|---|---|---|---|
| 2011/0131038 A1* | 6/2011 | Oyaizu | G10L 15/06 704/10 |
| 2014/0025381 A1* | 1/2014 | Wang | G10L 25/69 704/260 |
| 2014/0122081 A1* | 5/2014 | Kaszczuk | G10L 13/08 704/260 |

* cited by examiner

DYNAMIC SPEECH SYSTEM TUNING

TECHNICAL FIELD

The present invention relates to speech systems and, more particularly, to tuning grammars, dictionaries, or databases used by automatic speech recognition (ASR) systems and text-to-speech (TTS) systems.

BACKGROUND

Modern vehicles include a wide array of different technologies. These technologies include ASR systems and TTS systems comprising computers that can convert speech into text-based representations of the speech, and text data into audible speech, respectively. The ASR and TTS systems often access grammars, dictionaries, or databases that contain words or parts of words that aid in identifying received speech or text. But even with large grammars or dictionaries, the systems still may not be able to clearly interpret speech or translate language. For example, new music artists often make creative changes to common words and adopt those changes as a sobriquet. This can be appreciated from the name of musical artist "Flo Rida" who in text form uses the common spelling of the state of Florida. However, the musical artist "Flo Rida" pronounces his name using a long "i" sound whereas descriptions of the state call for a short "i" pronunciation. Both ASR and TTS systems may struggle to distinguish the musical artist from the state when interpreting received speech or outputting speech generated from text.

SUMMARY

According to one embodiment, there is provided a method of tuning speech recognition systems. The method includes performing text-to-speech conversion of text data; detecting the accuracy of speech converted from text data; determining that the detected accuracy is below a predetermined threshold; recording a user recitation of the text data in response to the determination; and storing the user recitation in an exception database located at a vehicle.

According to another embodiment, there is provided a method of tuning speech recognition systems. The method includes performing text-to-speech conversion of text data at a vehicle; presenting the text data as converted speech via an audio system at the vehicle; detecting the accuracy of the speech converted from text data; determining that the detected accuracy is below a predetermined threshold; prompting a vehicle occupant for a recitation of the text data; recording the recitation of the text data as an audio file; and adding the audio file to an exception database maintained at the vehicle.

According to yet another embodiment, there is provided a method of tuning speech recognition systems. The method includes receiving speech input at a microphone from a user; recording the received speech input received from the user; determining using an automatic speech recognition (ASR) system that the recognition of speech input fell below a high-confidence threshold; separating the recorded speech into sounds; and associating the separated sounds with the received speech in an exception dictionary that is accessed by both the ASR system and a text-to-speech (TTS) system.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below tunes speech recognition systems based on user input to more accurately interpret words as speech or text. As used herein, the term "speech recognition systems" can refer to an automatic speech recognition (ASR) system, a text-to-speech (TTS) system, or both. And regardless of the language(s) interpreted by the speech recognition systems, every language includes words or phrases that may not be accurately recognized as part of speech recognition or accurately synthesized into speech from text by the TTS system. In either event, it can be helpful to detect when default or standard dictionaries or grammars accessed by speech recognition systems do not provide accurate translations of particular words or phrases. As pointed out above, speech recognition systems can struggle to identify words having a non-standard usage. To use another example, the music artist "Ke$ha" can be pronounced "Kesha" when spoken. But to the TTS system "Ke$ha" can be interpreted as "K" "ae" "dollar" "ha." Such an interpretation can leave a user of the TTS system feeling that this output is "robotized." Similarly, the ASR system may hear the word "Kesha" spoken by a user but not be able to find matching text in a dictionary or database during the course of the search because the system cannot find "Kesha" and "Ke$ha" is ignored. Besides music artists, speech recognition systems can struggle with other words and phrases as well. For example, many phonebook entries may have names that use standard spellings but are spoken using a non-standard pronunciation. In some names, vowels that are traditionally pronounced as short become long and vice-versa.

When these words are received by the speech recognition systems, they can attempt to identify them and then assess the accuracy of their work. When the speech recognition systems determine that identification of these words falls below a threshold, a user can then be asked to verbally recite the word or phrase. The speech recognition systems can record the users voice and then break the word(s) or phrase(s) from the users voice into phoneme data or subwords, which can then be included in an exception dictionary stored locally at a vehicle. The exception dictionary can be accessed by both ASR and TTS systems to interpret received speech and text in the future. As a result, the speech recognition systems can then identify or output words having non-standard usage more accurately.

Figure 1:
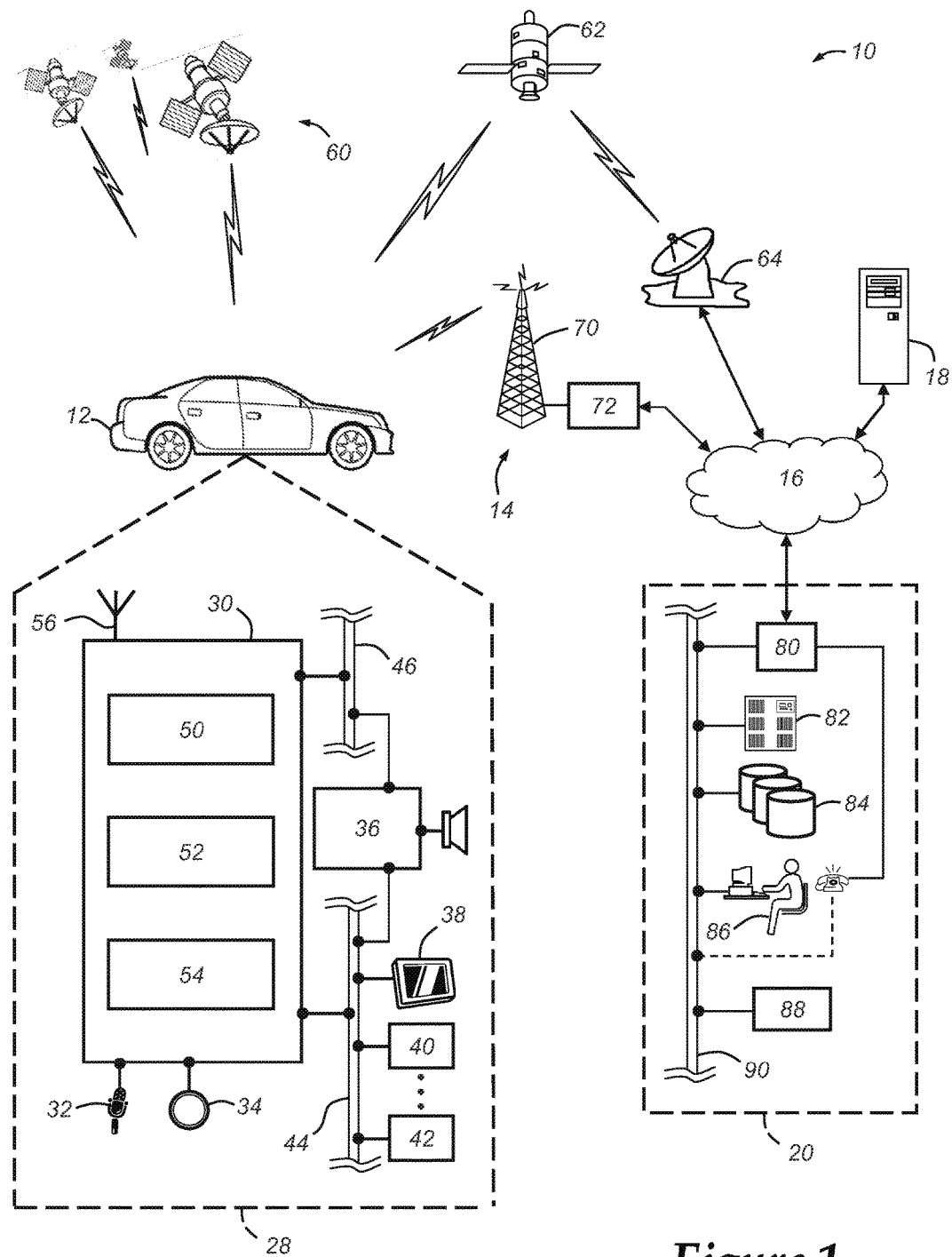
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
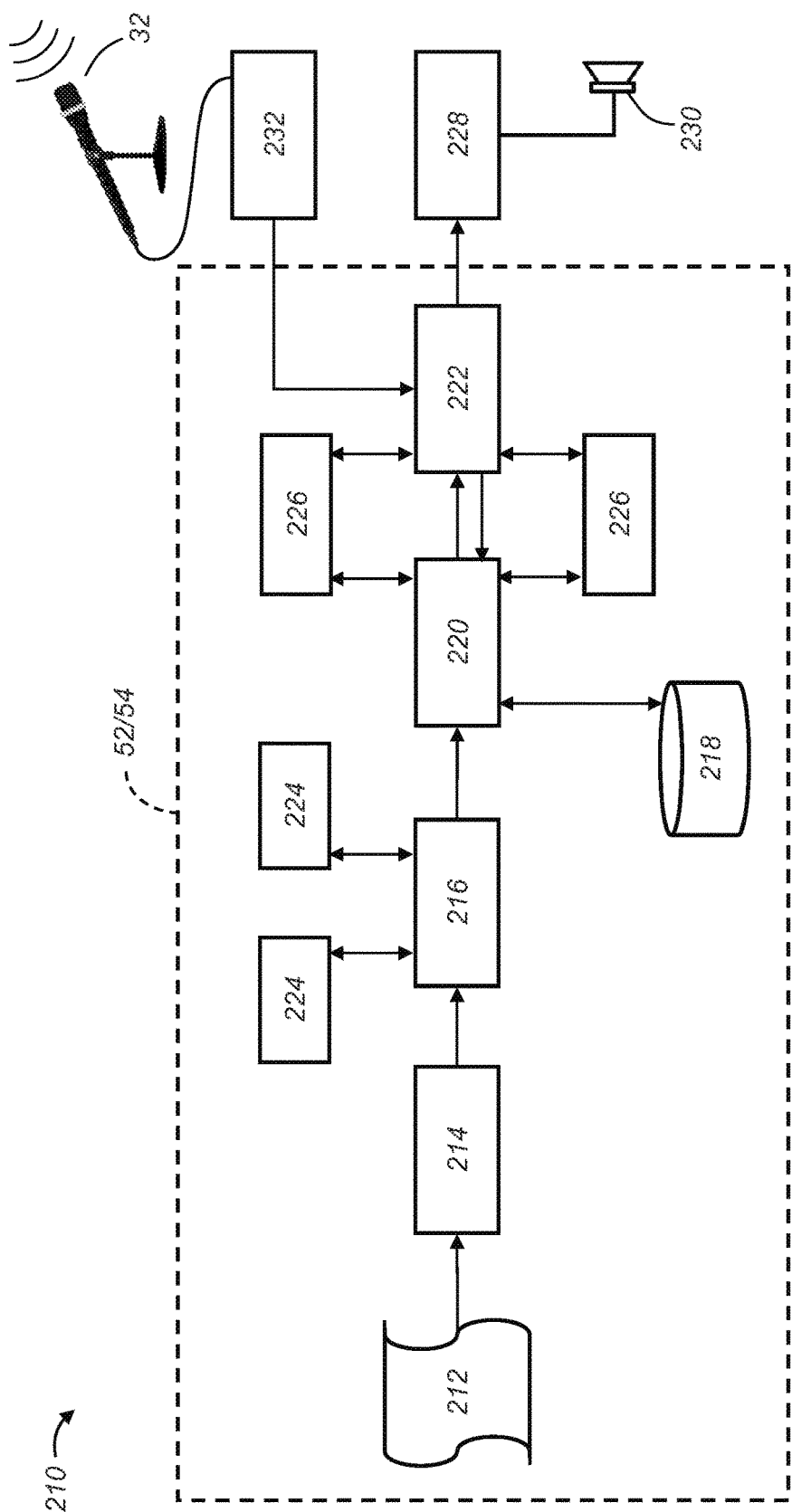
FIG. 2 is a block diagram depicting an embodiment of a text-to-speech (TTS) system that is capable of utilizing the method disclosed herein.

Turning now to FIG. 2, there is shown an illustrative architecture for a text-to-speech (TTS) system 210 that can be used to enable the presently disclosed method. In general, a user or vehicle occupant may interact with a TTS system to receive instructions from or listen to menu prompts of an application, for example, a vehicle navigation application, a hands free calling application, or the like. There are many varieties of TTS synthesis, including formant TTS synthesis and concatenative TTS synthesis. Formant TTS synthesis does not output recorded human speech and, instead, outputs computer generated audio that tends to sound artificial and robotic. In concatenative TTS synthesis, segments of stored human speech are concatenated and output to produce smoother, more natural sounding speech. Generally, a concatenative TTS system extracts output words or identifiers from a source of text, converts the output into appropriate language units, selects stored units of speech that best correspond to the language units, converts the selected units of speech into audio signals, and outputs the audio signals as audible speech for interfacing with a user.

TTS systems are generally known to those skilled in the art, as described in the background section. But FIG. 2 illustrates an example of an improved TTS system according to the present disclosure. According to one embodiment, some or all of the system 210 can be resident on, and processed using, the telematics unit 30 of FIG. 1. According to an alternative illustrative embodiment, some or all of the TTS system 210 can be resident on, and processed using, computing equipment in a location remote from the vehicle 12, for example, the call center 20. For instance, linguistic models, acoustic models, and the like can be stored in memory of one of the servers 82 and/or databases 84 in the call center 20 and communicated to the vehicle telematics unit 30 for in-vehicle TTS processing. Similarly, TTS software can be processed using processors of one of the servers 82 in the call center 20. In other words, the TTS system 210 can be resident in the telematics unit 30 or distributed across the call center 20 and the vehicle 12 in any desired manner.

The system 210 can include one or more text sources 212, and a memory, for example the telematics memory 54, for storing text from the text source 212 and storing TTS software and data. The system 210 can also include a processor, for example the telematics processor 52, to process the text and function with the memory and in conjunction with the following system modules. A pre-processor 214 receives text from the text source 212 and converts the text into suitable words or the like. A synthesis engine 216 converts the output from the pre-processor 214 into appropriate language units like phrases, clauses, and/or sentences. One or more speech databases 218 store recorded speech. A unit selector 220 selects units of stored speech from the database 218 that best correspond to the output from the synthesis engine 216. A post-processor 222 modifies or adapts one or more of the selected units of stored speech. One or more or linguistic models 224 are used as input to the synthesis engine 216, and one or more acoustic models 226 are used as input to the unit selector 220. The system 210 also can include an acoustic interface 228 to convert the selected units of speech into audio signals and a loudspeaker 230, for example of the telematics audio system, to convert the audio signals to audible speech. The system 210 further can include a microphone, for example the telematics microphone 32, and an acoustic interface 232 to digitize speech into acoustic data for use as feedback to the post-processor 222.

The text source 212 can be in any suitable medium and can include any suitable content. For example, the text source 212 can be one or more scanned documents, text files or application data files, or any other suitable computer files, or the like. The text source 212 can include words, numbers, symbols, and/or punctuation to be synthesized into speech and for output to the text converter 214. Any suitable quantity and type of text sources can be used.

The pre-processor 214 converts the text from the text source 212 into words, identifiers, or the like. For example, where text is in numeric format, the pre-processor 214 can convert the numerals to corresponding words. In another example, where the text is punctuation, emphasized with caps or other special characters like umlauts to indicate appropriate stress and intonation, underlining, or bolding, the pre-processor 214 can convert same into output suitable for use by the synthesis engine 216 and/or unit selector 220.

The synthesis engine 216 receives the output from the text converter 214 and can arrange the output into language units that may include one or more sentences, clauses, phrases, words, subwords, and/or the like. The engine 216 may use the linguistic models 224 for assistance with coordination of most likely arrangements of the language units. The linguistic models 224 provide rules, syntax, and/or semantics in arranging the output from the text converter 214 into language units. The models 224 can also define a universe of language units the system 210 expects at any given time in any given TTS mode, and/or can provide rules, etc., governing which types of language units and/or prosody can logically follow other types of language units and/or prosody to form natural sounding speech. The language units can be comprised of phonetic equivalents, like strings of phonemes or the like, and can be in the form of phoneme HMM's.

The speech database 218 includes pre-recorded speech from one or more people. The speech can include pre-recorded sentences, clauses, phrases, words, subwords of pre-recorded words, and the like. The speech database 218 can also include data associated with the pre-recorded speech, for example, metadata to identify recorded speech segments for use by the unit selector 220. Any suitable type and quantity of speech databases can be used.

The unit selector 220 compares output from the synthesis engine 216 to stored speech data and selects stored speech that best corresponds to the synthesis engine output. The speech selected by the unit selector 220 can include pre-recorded sentences, clauses, phrases, words, subwords of pre-recorded words, and/or the like. The selector 220 may use the acoustic models 226 for assistance with comparison and selection of most likely or best corresponding candidates of stored speech. The acoustic models 226 may be used in conjunction with the selector 220 to compare and contrast data of the synthesis engine output and the stored speech data, assess the magnitude of the differences or similarities therebetween, and ultimately use decision logic to identify best matching stored speech data and output corresponding recorded speech.

In general, the best matching speech data is that which has a minimum dissimilarity to, or highest probability of being, the output of the synthesis engine 216 as determined by any of various techniques known to those skilled in the art. Such techniques can include dynamic time-warping classifiers, artificial intelligence techniques, neural networks, free phoneme recognizers, and/or probabilistic pattern matchers such as Hidden Markov Model (HMM) engines. HMM engines are known to those skilled in the art for producing multiple TTS model candidates or hypotheses. The hypotheses are considered in ultimately identifying and selecting that stored speech data which represents the most probable correct interpretation of the synthesis engine output via acoustic feature analysis of the speech. More specifically, an HMM engine generates statistical models in the form of an "N-best" list of language unit hypotheses ranked according to HMM-calculated confidence values or probabilities of an observed sequence of acoustic data given one or another language units, for example, by the application of Bayes' Theorem.

In one embodiment, output from the unit selector 220 can be passed directly to the acoustic interface 228 or through the post-processor 222 without post-processing. In another embodiment, the post-processor 222 may receive the output from the unit selector 220 for further processing.

In either case, the acoustic interface 228 converts digital audio data into analog audio signals. The interface 228 can be a digital to analog conversion device, circuitry, and/or software, or the like. The loudspeaker 230 is an electroacoustic transducer that converts the analog audio signals into speech audible to a user and receivable by the microphone 32.

The method or parts thereof can be implemented in a computer program product embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 3:
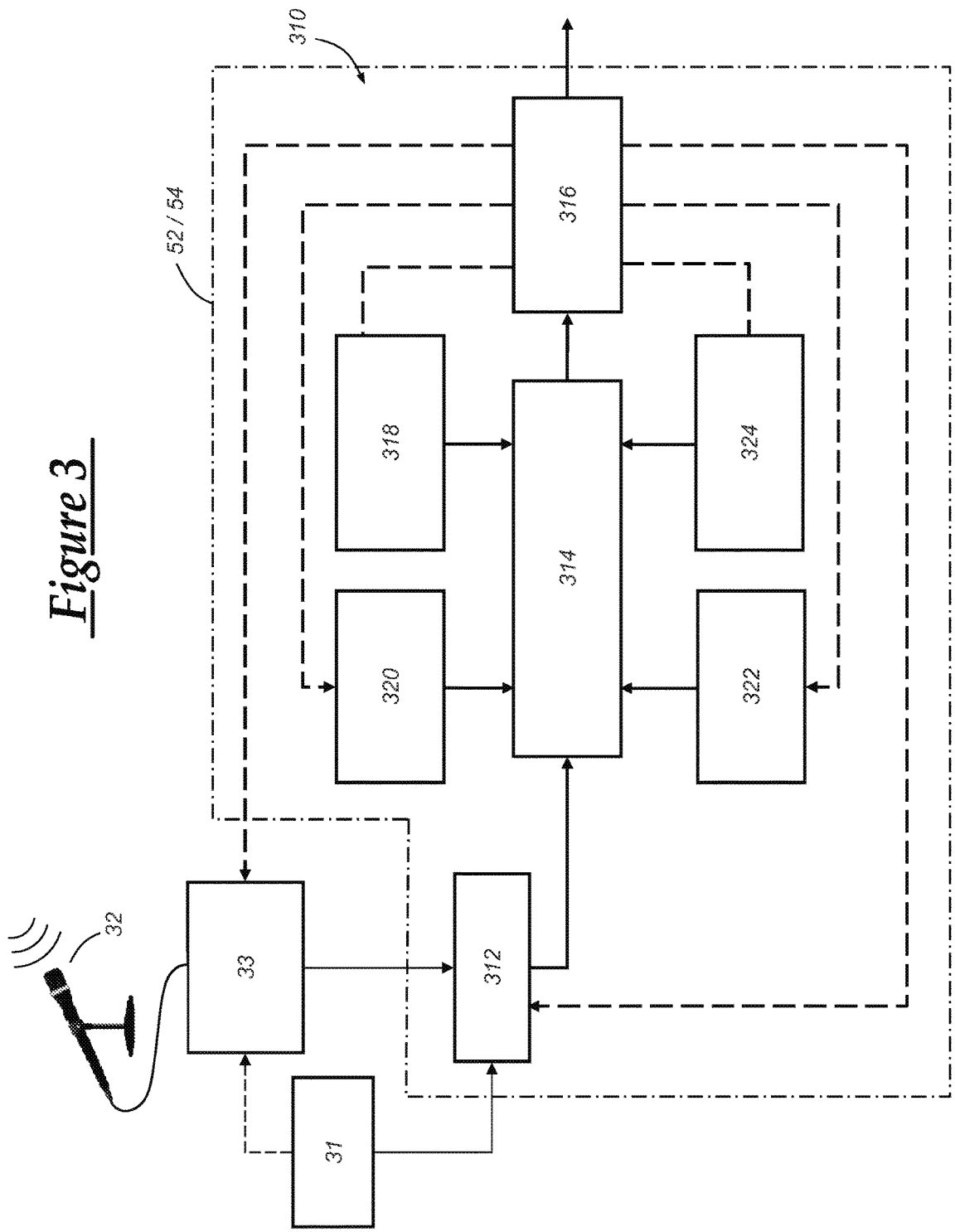
FIG. 3 is a block diagram depicting an embodiment of an automatic speech recognition (ASR) system that is capable of utilizing the method disclosed herein.

Turning now to FIG. 3, there is shown an exemplary architecture for an ASR system 310 that can be used to enable the presently disclosed method. In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 3 illustrates just one specific exemplary ASR system 310. The system 310 includes a device to receive speech such as the telematics microphone 32, and an acoustic interface 33 such as a sound card of the telematics unit 30 having an analog to digital converter to digitize the speech into acoustic data. The system 310 also includes a memory such as the telematics memory 54 for storing the acoustic data and storing speech recognition software and databases, and a processor such as the telematics processor 52 to process the acoustic data. The processor functions with the memory and in conjunction with the following modules: one or more front-end processors, pre-processors, or pre-processor software modules 312 for parsing streams of the acoustic data of the speech into parametric representations such as acoustic features; one or more decoders or decoder software modules 314 for decoding the acoustic features to yield digital subword or word output data corresponding to the input speech utterances; and one or more back-end processors, post-processors, or post-processor software modules 316 for using the output data from the decoder module(s) 314 for any suitable purpose.

The system 310 can also receive speech from any other suitable audio source(s) 31, which can be directly communicated with the pre-processor software module(s) 312 as shown in solid line or indirectly communicated therewith via the acoustic interface 33. The audio source(s) 31 can include, for example, a telephonic source of audio such as a voice mail system, or other telephonic services of any kind.

One or more modules or models can be used as input to the decoder module(s) 314. First, grammar and/or lexicon model(s) 318 can provide rules governing which words can logically follow other words to form valid sentences. In a broad sense, a lexicon or grammar can define a universe of vocabulary the system 310 expects at any given time in any given ASR mode. For example, if the system 310 is in a training mode for training commands, then the lexicon or grammar model(s) 318 can include all commands known to and used by the system 310. In another example, if the system 310 is in a main menu mode, then the active lexicon or grammar model(s) 318 can include all main menu commands expected by the system 310 such as call, dial, exit, delete, directory, or the like. Second, acoustic model(s) 320 assist with selection of most likely subwords or words corresponding to input from the pre-processor module(s) 312. Third, word model(s) 322 and sentence/language model(s) 324 provide rules, syntax, and/or semantics in placing the selected subwords or words into word or sentence context. Also, the sentence/language model(s) 324 can define a universe of sentences the system 310 expects at any given time in any given ASR mode, and/or can provide rules, etc., governing which sentences can logically follow other sentences to form valid extended speech.

According to an alternative exemplary embodiment, some or all of the ASR system 310 can be resident on, and processed using, computing equipment in a location remote from the vehicle 12 such as the call center 20. For example, grammar models, acoustic models, and the like can be stored in memory of one of the servers 82 and/or databases 84 in the call center 20 and communicated to the vehicle telematics unit 30 for in-vehicle speech processing. Similarly, speech recognition software can be processed using processors of one of the servers 82 in the call center 20. In other words, the ASR system 310 can be resident in the telematics unit 30 or distributed across the call center 20 and the vehicle 12 in any desired manner, and/or resident at the call center 20.

First, acoustic data is extracted from human speech wherein a vehicle occupant speaks into the microphone 32, which converts the utterances into electrical signals and communicates such signals to the acoustic interface 33. A sound-responsive element in the microphone 32 captures the occupant's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module(s) 312 transforms the continuous stream of digital speech data into discrete sequences of acoustic parameters. More specifically, the processor 52 executes the pre-processor module(s) 312 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module(s) 312 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 314 to process the incoming feature vectors of each test pattern. The decoder module(s) 314 is also known as a recognition engine or classifier, and uses stored known reference patterns of speech. Like the test patterns, the reference patterns are defined as a concatenation of related acoustic frames and corresponding parameters. The decoder module(s) 314 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 314 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 322 and to construct sentences with the input from the language models 324.

Finally, the post-processor software module(s) 316 receives the output data from the decoder module(s) 314 for any suitable purpose. In one example, the post-processor software module(s) 316 can identify or select one of the reference patterns from the N-best list of single or multiple word reference patterns as recognized speech. In another example, the post-processor module(s) 316 can be used to convert acoustic data into text or digits for use with other aspects of the ASR system or other vehicle systems. In a further example, the post-processor module(s) 316 can be used to provide training feedback to the decoder 314 or pre-processor 312. More specifically, the post-processor 316 can be used to train acoustic models for the decoder module(s) 314, or to train adaptation parameters for the pre-processor module(s) 312.

Figure 4:
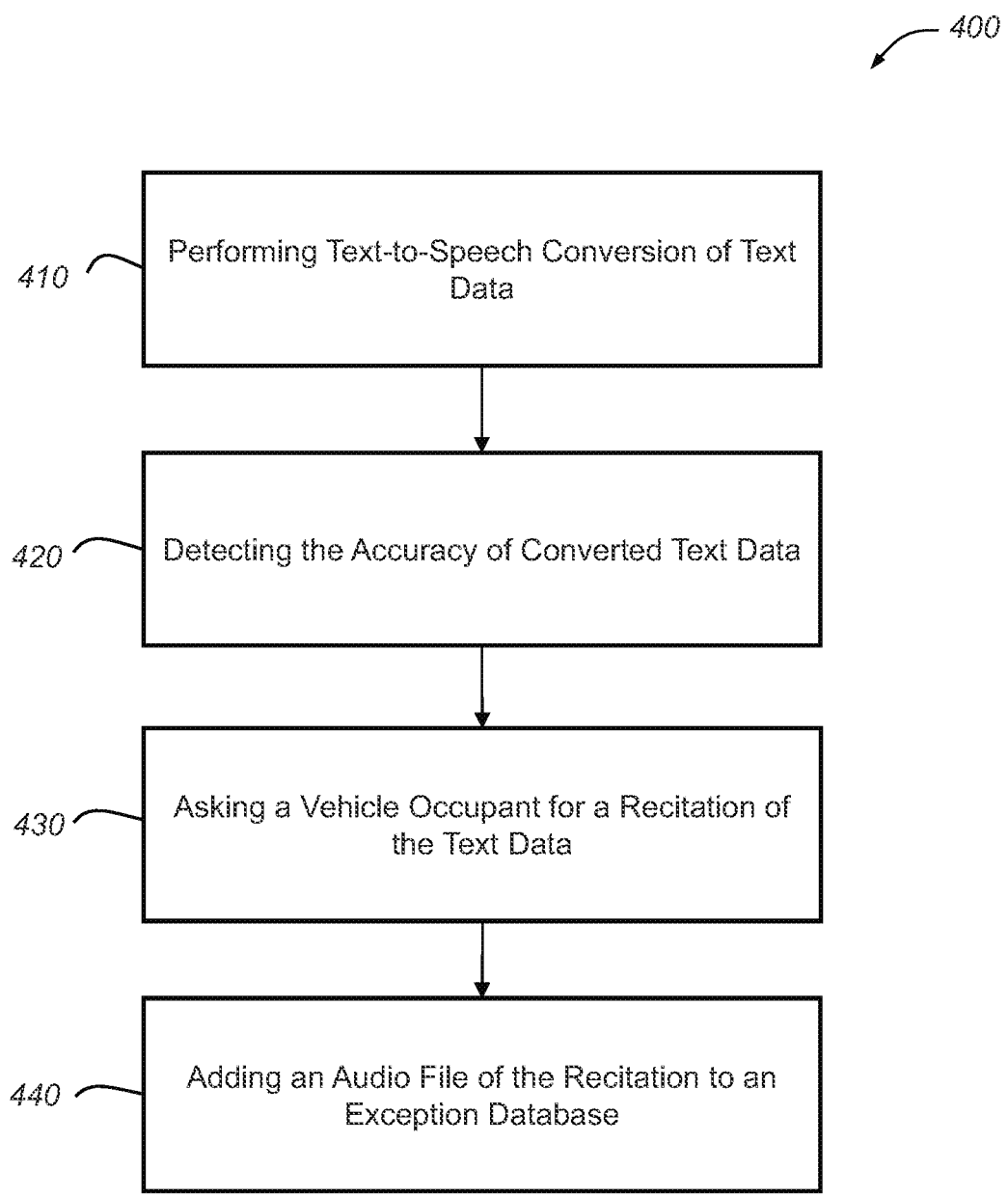
FIG. 4 is a block diagram of an embodiment of a method of tuning speech recognition systems.

Turning now to FIG. 4, there is shown a method 400 of tuning speech recognition systems. The method 400 begins at step 410 by performing text-to-speech conversion of text data at the vehicle 12 and presenting the converted speech via an audio system at the vehicle 12. As discussed above with respect to FIG. 2, default text data can be accessed from the text source 212 and ultimately output to the speaker 230 via the acoustic interface 228. To provide some context via an example, a vehicle occupant can request a song by visually scanning a list of artists shown on the visual display 38 of the vehicle 12 and select a song by an artist, such as the artist named "?uestlove." The vehicle telematics unit 30 can receive this request and respond by audibly repeating the artist's name as speech converted from the text shown on the visual display 38. However, when the text "?uestlove" is interpreted using text data from the text source 212, the speech conversion can be: "question mark" "est" "love." The speech conversion "question mark" "est" "love" can then be audibly played to the vehicle occupant in response to the request for "?uestlove." The vehicle occupant may notice the discrepancy between the common pronunciation of the artist's name ("kwest" "love") and the synthesized speech ultimately output by the TTS system 200. The input and/or output of the text-to-speech conversion can be monitored using a counter for the number of times the method 400 converts a particular word or phrase. Applied to the musical artist "?uestlove," the method 400 can include incrementing a counter each time the name "?uestlove" is interpreted using text data. The method 400 proceeds to step 420.

At step 420, the accuracy of the speech converted from text data is detected. Similar to the ASR systems, modern Text-To-Speech systems can be based on Hidden Markov Models. The output from a TTS Engine could be determined using a confidence score or likelihood probability based approach. It can also be determined that the detected accuracy is below a predetermined threshold. The TTS system 200 could classify the speech output as falling into one of three categories: a high confidence result, a medium confidence result, and a low confidence result. Using a scale of confidence between 0% meaning the TTS system 200 has no confidence in the result and 100% meaning the TTS system 200 is absolutely confident in the result, various thresholds can be established. For example, TTS system 200 confidence results below 40% can be classified as low confidence results, above 60% as high confidence results, and in-between 40-60% as medium confidence results. In addition, the occurrence of medium confidence results can include determining whether or not a plurality of hypotheses fall within a delta confidence threshold and, if so, presenting each speech hypothesis or output to the user. In one implementation, the delta confidence threshold can be a percentage value, such as 2%. So, if the TTS system 200 identifies, for instance, three hypotheses or output results having confidence values of 51%, 50%, and 49%, each of the results can be presented to the user. When the TTS system 200 determines that the speech output is a high confidence result, the TTS system 200 can accept that the default combination of phonemes and sounds ascribed to the text data from the text source 212 is acceptable. For instance, if the vehicle occupant selected a song by the artist "Eminem" from the visual display 38, the TTS system 200 can access the text source 212 and synthesize the text representation of "Eminem" as "em" "in" "em." This output of "Eminem" can be viewed as accurately representing the actual pronunciation of "Eminem" and therefore be a high confidence result. However, using the example discussed with regard to step 420 involving the artist "?uestlove," the TTS system 200 may determine that its output falls below a threshold thereby classifying the output into a medium confidence result or a low confidence result. In that case, the TTS system 200 can then attempt to access and/or add to an exception database or dictionary. This will be discussed in more detail below. The method 400 proceeds to step 430.

At step 430, a vehicle occupant is asked for a recitation of the text data. The TTS system 200 may have determined that the synthesized speech output is unsatisfactory. Again, the TTS system 200 can make this determination as described in step 420. However, the vehicle occupant may alternatively reject the output of the TTS system 200 either through a verbal command as could be received by the ASR system 300, or by physically controlling an input at the vehicle 12, such as a virtual button presented on the visual display 38. The vehicle telematics unit 30 can then prompt or ask the vehicle occupant to verbally recite the text data and follow the prompt with a listening period during which speech from the microphone 32 is received and recorded. In the example discussed above involving the artist "?uestlove," the vehicle occupant may have rejected the synthesized speech output by the TTS system 200 by pressing a virtual button shown on the display 38. The vehicle telematics unit 30 can then generate a prompt to the vehicle occupant that asks "please recite the text following the tone." After the tone, the vehicle telematics unit 30 can begin listening for the vehicle occupant's correct pronunciation of the artist's name and record that pronunciation as an audio file. The vehicle occupant can then say "kwest" "love," which is then recorded at the vehicle 12. The audio file containing the pronunciation can be recorded as a .wav file, a .pcm file, or other similar file used to record sound. These audio files can be stored at the vehicle 12 in various places. For example, the audio files can be generally stored in digital memory devices 54. More particularly, the audio files can also be stored in the speech databases 218 or one of the ASR modules describe above with respect to the ASR system 300. The audio file can then be linked to or associated with the text data that generated the rejected output. The method 400 proceeds to step 440.

At step 440, the audio file is added to an exception database maintained at the vehicle 12. Once the audio file has been obtained from the vehicle occupant and associated with the text data, the ASR system 300 can analyze the speech in the audio file, separate the words in the audio file into phonemes, and can also append the phonemic transcription to common linguistic components (CLCs), generally also referred to as global dictionary or sub-words that can be used by the TTS system 200 to generate speech data from text data. In one implementation the text data that initially caused the rejected output from the TTS system 200 can be linked in an exception database with the audio file, the analysis of the audio file (e.g., phonemes, CLCs, or sub-words), or both. As part of this linking, the TTS system 200 can identify the text data with a flag or a rule that can be appended to a user rule-set such that when the text data is encountered again, the TTS system 200 can access the exception database and use the audio file and/or its analysis to generate synthesized speech. The user rule set can be associated with a particular user.

In addition, the exception database can also be accessed by the ASR system 300 as part of speech recognition. For instance, using the "?uestlove" example above, the ASR system 300 can receive speech from a vehicle occupant asking for a song by "kwest" "love" and access the acoustic model 320 as part of identifying text associated with the received speech. When accessing the acoustic model 320, the ASR system 310 can compare the phonemes or subwords of "kwest" "love" with the content of the exception database. The exception database can alert the ASR system 300 to non-standard text data associated with the subwords "kwest" "love." The ASR system 300 can then output the text "?uestlove" in response to the received speech. Thus, the audio file not only can assist in increasing the accuracy of the speech synthesized or output by the TTS system 200, but it can also increase the accuracy of the text output by the ASR system 300. The method 400 then ends.

Figure 5:
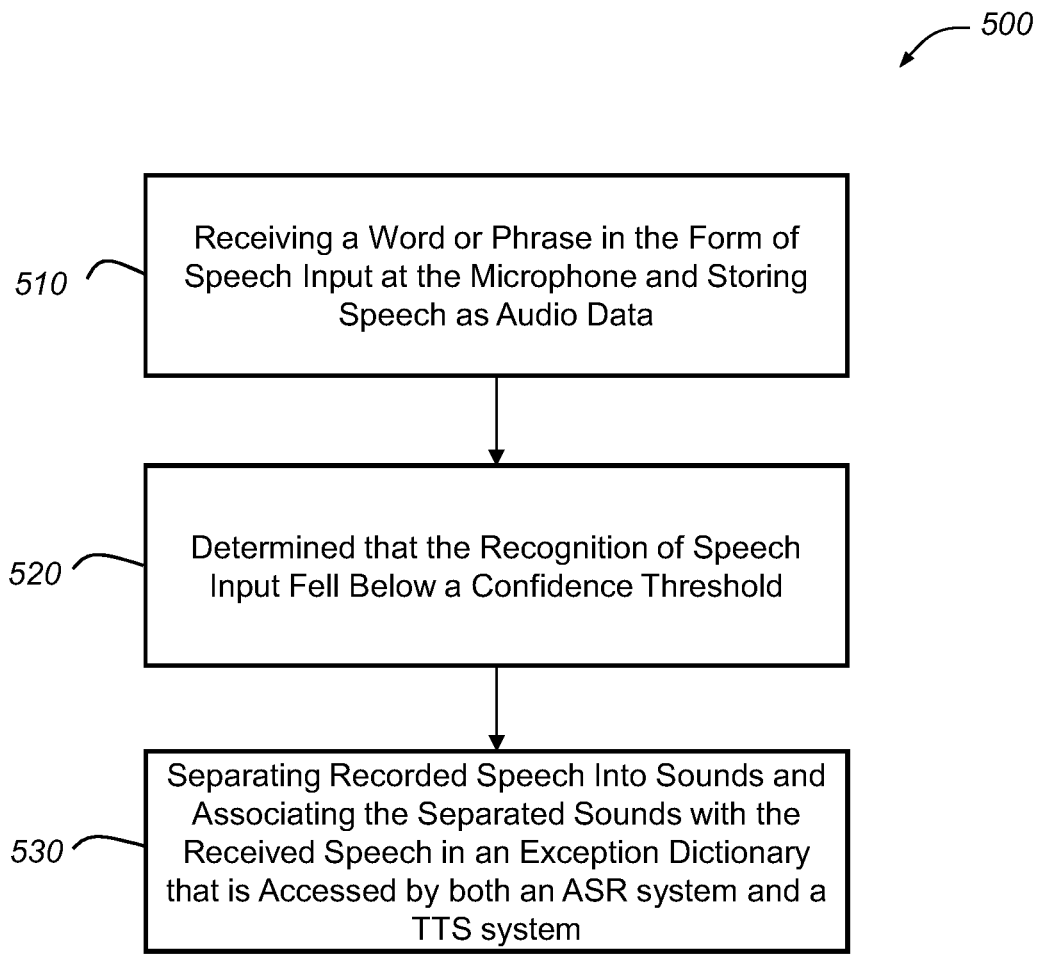
FIG. 5 is a block diagram of another embodiment of a method of tuning speech recognition systems.

Turning to FIG. 5, there is shown a method 500 of tuning speech recognition systems. The method 500 begins at step 510 by receiving a word or phrase in the form of speech input at the microphone 32. And each word, phrase, or speech recognition session can be stored as audio data at the vehicle 12. For instance, a user or vehicle occupant can attempt to use voice dialing features offered by the vehicle telematics unit 30. As part of voice dialing, the user can say a person's name as part of a spoken phrase, such as "call Colin." When the user recites this phrase, it can be stored as an audio file using one of the formats identified above. As the user continues using the ASR system 300, it can continue storing audio files of user speech for each use. In one implementation, the ASR system 300 can store over twenty audio files each of which was recorded during a different speech recognition session. The lexicon that comprises the default pronunciations can work in conjunction with the text grammars. The method 500 proceeds to step 520.

At step 520, it is determined using the ASR system 300 that the recognition of speech input fell below a confidence threshold. The confidence thresholds can be described as a low confidence threshold, a medium confidence threshold, or a high confidence threshold as is described above with respect the TTS system 200. Using a scale of confidence between 0% meaning the ASR system 300 has no confidence in its interpretation of received speech and 100% meaning the ASR system 300 is absolutely confident in its interpretation, various thresholds can be established. For example, ASR system 300 confidence results below 40% can be classified as low confidence results, above 60% as high confidence results, and in-between 40-60% as medium confidence results. In addition, the occurrence of medium confidence results can include determining whether or not a plurality of hypotheses fall within a delta confidence threshold and, if so, presenting each hypothesis to the user. In one implementation, the delta confidence threshold can be a percentage value, such as 2%. So, if the ASR system 300 identifies, for instance, three hypotheses or results having confidence values of 51%, 50%, and 49%, each of the results can be presented to the user. Ultimately, the ASR system 300 can associate the correct text representation of spoken words or phrases with the received speech. That is, the user or speaker ultimately can confirm the word or phrase the user uttered and the ASR system 300 can associate the audio or speech received with the text of the word or phrase associated with that audio/speech.

The ASR system 300 can also monitor the number of times the resulting analysis or interpretation of received speech falls above or below the high confidence threshold for each word or phrase. The ASR system 300 can receive a particular word or phrase as speech a plurality of times. As part of receiving the speech multiple times, the ASR system 30 can identify how many times the particular word or phrase falls below the high confidence threshold. In one implementation, the ASR system 300 can identify a problem when more than one-half or one-third of the time the word or phrase falls below the high confidence threshold. It should be appreciated that the number of times the results fall below the high confidence threshold can be varied before identifying a problem depending on a particular implementation. The method 500 proceeds to step 530.

At step 530, the recorded speech is separated into sounds and the separated sounds are associated with the received speech in an exception dictionary that is accessed by both the ASR system 300 and the text-to-speech (TTS) system 200. Once the ASR system 300 has determined that a problem exists with its interpretation, the ASR system 300 can then access the recorded speech associated with the words or phrase of that speech, separate the recorded speech into phonemes or sounds, and analyze the phonemes using acoustic models having alternative pronunciations. Using the voice dialing example above, the user can say a person's name as part of a spoken phrase, such as "call Colin." Here, "Colin" may be analyzed by the ASR system 300 using a default acoustical model that outputs the name as having a short "o" sound. However, the user may be referring to someone who pronounces the name using a long "o" sound. After the user has uttered the name "Colin" a number of times and the ASR system 300 has output analysis results below the high confidence threshold for more than a third of those analysis attempts, the ASR system 300 can determine that it incorrectly interprets the name "Colin." The ASR system 300 can then access the audio files associated with the word "Colin" and separate the name into its sounds. As part of this, the ASR system 300 can determine that the default acoustical model interprets the name as including a short "o" and then access a non-default acoustical model that calls for a long "o" sound. The association of the long "o" sound with the name "Colin" can be saved in an exception dictionary or model. Later, when the ASR system 300 interprets the name "Colin," the system 300 can recognize a flag or other signifier directing analysis of the name to the exception dictionary. The TTS system 200 can also access the exception dictionary when reading text of the name "Colin" and output the name as having a long "o" sound based on the exception created by the ASR system 300. The method 500 ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of tuning a text-to-speech (TTS) system, comprising the steps of:
    (a) receiving text data and performing text-to-speech conversion of the received text data using the TTS system;
    (b) using the TTS system, detecting the accuracy of speech converted from the received text data, wherein the TTS system automatically detects the accuracy of the speech converted from the received text data using Hidden Markov Models (HMMs);
    (c) determining, within the TTS system, that the detected accuracy in step (b) is below a predetermined threshold;
    (d) recording a user recitation of the received text data in response to the determination in step (c);
    (e) storing the user recitation of the received text data as an audio file in an exception database located at a vehicle;
    (f) using an automatic speech recognition (ASR) system, generating an analysis of speech in the audio file by separating words in the audio file into phonemes, and appending a phonemic transcription to common linguistic components (CLCs); and
    (g) linking the received text data in the TTS system to the audio file in the exception database, the analysis of the audio file, or both, wherein when performing subsequent text-to-speech conversion of the received text data, the link directs the TTS system to access the audio file in the exception database, the analysis of the audio file, or both.

2. The method of claim 1, further comprising the step of accessing the exception database using an automatic speech recognition (ASR) system.

3. The method of claim 1, further comprising the step of identifying the text data in response to a selection made on a visual display.

4. The method of claim 1, further comprising the step of incrementing a counter each time the text data is converted to speech.

5. The method of claim 1, wherein the accuracy is detected based at least partly on input received from a vehicle occupant.

6. The method of claim 1, wherein the predetermined threshold lies above a medium confidence result and a low confidence result.

7. The method of claim 1, further including identifying the received text data with a flag, a rule, or both, that directs the TTS system to access the audio file in the exception database, the analysis of the audio file, or both, when performing subsequent text-to-speech conversion of the received text data.

8. A method of tuning a text-to-speech (TTS) system, comprising the steps of:
    (a) receiving text data and performing text-to-speech conversion of the received text data at a vehicle using a text-to-speech (TTS) system;
    (b) presenting the received text data as converted speech via an audio system at the vehicle;
    (c) detecting the accuracy of the speech converted from received text data at the TTS system, wherein the TTS system automatically detects the accuracy of the speech converted from text data using Hidden Markov Models (HMMs);
    (d) determining, within the TTS system, that the detected accuracy in step (b) is below a predetermined threshold;
    (e) prompting a vehicle occupant for a recitation of the received text data in response to step (d);
    (f) recording the recitation of the received text data as an audio file;
    (g) adding the audio file to an exception database maintained at the vehicle, wherein an automatic speech recognition (ASR) system analyzes speech in the audio file, separates words in the audio file into phonemes, and appends a phonemic transcription to common linguistic components (CLCs); and (h) linking the received text data in the TTS system to the audio file in the exception database, an analysis of the audio file in the ASR system, or both, wherein when performing subsequent text-to-speech conversion of the received text data, the link directs the TTS system to access the audio file in the exception database, the analysis of the audio file, or both.

9. The method of claim 8, further comprising the step of accessing the exception database using an automatic speech recognition (ASR) system.

10. The method of claim 8, further comprising the step of identifying the text data in response to a selection made on a visual display.

11. The method of claim 8, further comprising the step of incrementing a counter each time the text data is converted to speech.

12. The method of claim 8, wherein the accuracy is detected based at least partly on input received from the vehicle occupant.

13. The method of claim 8, wherein the predetermined threshold lies above a medium confidence result and a low confidence result.

14. The method of claim 8, further including identifying the text data with a flag, a rule, or both, that directs the TTS system to access the audio file in the exception database, the analysis of the audio file in the ASR system, or both, when performing subsequent text-to-speech conversion of the text data.

* * * * *